US008818424B2

(12) United States Patent
Emadzadeh et al.

(10) Patent No.: US 8,818,424 B2
(45) Date of Patent: Aug. 26, 2014

(54) INTER-AP DISTANCE ESTIMATION USING CROWD SOURCING

(71) Applicant: QUALCOMM Incorporated, San Diego, CA (US)

(72) Inventors: Amir A. Emadzadeh, Santa Clara, CA (US); Sai Pradeep Venkatraman, Santa Clara, CA (US); Weihua Gao, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/733,648

(22) Filed: Jan. 3, 2013

(65) Prior Publication Data

US 2014/0187257 A1 Jul. 3, 2014

(51) Int. Cl.
*H04W 24/00* (2009.01)
*H04B 7/00* (2006.01)
*G01S 19/00* (2010.01)
*G01S 3/02* (2006.01)
*H04W 4/04* (2009.01)

(52) U.S. Cl.
CPC ..................................... *H04W 4/04* (2013.01)
USPC ..... 455/457; 455/456.1; 455/524; 342/357.2; 342/451; 342/464

(58) Field of Classification Search
CPC ....... G01S 19/46; H04W 64/003; H04W 4/04
USPC ............ 342/357.2, 451, 464; 455/457, 456.1, 455/524; 370/252, 328
See application file for complete search history.

(56) References Cited

U.S. PATENT DOCUMENTS

| | | | |
|---|---|---|---|
| 8,094,636 B2 | 1/2012 | Yamaoka et al. | |
| 8,107,438 B1 * | 1/2012 | Singh et al. | 370/332 |
| 2006/0290568 A1 * | 12/2006 | Sillasto | 342/464 |
| 2008/0125161 A1 * | 5/2008 | Ergen et al. | 455/524 |
| 2008/0268873 A1 * | 10/2008 | Wymeersch et al. | 455/456.6 |
| 2009/0125630 A1 | 5/2009 | Gogic | |
| 2009/0149198 A1 | 6/2009 | Nam et al. | |
| 2010/0046388 A1 | 2/2010 | Kim et al. | |
| 2010/0135178 A1 * | 6/2010 | Aggarwal et al. | 370/252 |
| 2012/0225678 A1 * | 9/2012 | Cha et al. | 455/457 |
| 2013/0307723 A1 * | 11/2013 | Garin et al. | 342/357.29 |
| 2013/0344886 A1 * | 12/2013 | Jarvis et al. | 455/456.1 |

* cited by examiner

*Primary Examiner* — Opiribo Georgewill
(74) *Attorney, Agent, or Firm* — Kilpatrick Townsend & Stockton LLP

(57) ABSTRACT

Techniques are provided for utilizing one or more mobile devices to estimate distances between wireless access points (APs). Embodiments can, for example, enable mobile devices, wireless APs, and/or other systems to estimate a distance between two wireless APs using Round-Trip Time (RTT) measurements obtained by one or more mobile devices. The RTT measurements can be utilized based on whether one or more related Received Signal Strength Indication (RSSI) measurements exceed a threshold value. Embodiments can also utilize crowdsourcing to obtain distance estimation data (e.g., distance estimates, RTT and/or RSSI measurements, etc.) from one or more mobile devices and/or propagate a determined distance, based on the distance estimation data, to multiple devices.

34 Claims, 7 Drawing Sheets

INTER-AP DISTANCE ESTIMATION USING CROWD SOURCING

BACKGROUND

Mobile communications networks are in the process of offering increasingly sophisticated capabilities associated with the motion and/or position location sensing of a mobile device. New software applications, such as those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as a 911 call in the United States.

Wireless access points (APs) of a data communication network can be utilized to determine the location of a mobile device. For example, the distances between the mobile device and multiple wireless APs can be measured, and position can be determined using triangulation and/or other positioning techniques. Distances between the wireless APs can be used to help determine the geometry of the wireless APs, and potentially their absolute positions, which can further increase the accuracy of the location determination.

SUMMARY

Embodiments of the present invention are directed toward utilizing one or more mobile devices to estimate distances between wireless access points (APs). Embodiments can, for example, enable mobile devices, wireless APs, and/or other systems to estimate a distance between two wireless APs using Round-Trip Time (RTT) measurements obtained by one or more mobile devices. The RTT measurements can be utilized based on whether one or more related Received Signal Strength Indication (RSSI) measurements exceed a threshold value. Embodiments can also utilize crowdsourcing to obtain distance estimation data (e.g., distance estimates, RTT and/or RSSI measurements, etc.) from one or more mobile devices and propagate a determined distance, based on the distance estimation data, to multiple devices.

An example method for providing an estimated distance between a first wireless access point to a second wireless access point using a mobile device, according to the disclosure, includes obtaining, with the mobile device, a plurality of data sets. Each data set of the plurality of data sets includes data regarding a first Round-Trip Time (RTT) value relating to a distance between the mobile device and the first wireless access point, and a second RTT value relating to a distance between the mobile device and the second wireless access point. The method further comprises sending, with the mobile device, the estimated distance between the first wireless access point and the second wireless access point. The estimated distance is based on at least one data set of the plurality of data sets.

Another example method for crowdsourcing a determined distance between a first wireless access point and a second wireless access point of an indoor positioning system, according to the disclosure, includes receiving distance estimation data relating to a distance between the first wireless access point and the second wireless access point, determining the distance between the first wireless access point and the second wireless access point based on the distance estimation data, and sending the determined distance via a wireless communications interface.

An example mobile device adapted to providing an estimated distance between a first wireless access point to a second wireless access point, according to the disclosure, includes a wireless communications interface, a processing unit communicatively coupled with the wireless communications interface, and a memory coupled to the processing unit. The memory stores executable instructions for causing the processing unit to obtain a plurality of data sets. Each data set of the plurality of data sets includes data regarding a first Round-Trip Time (RTT) value relating to a distance between the mobile device and the first wireless access point, and a second RTT value relating to a distance between the mobile device and the second wireless access point. The memory also stores executable instructions for causing the processing unit to send, via the wireless communications interface, the estimated distance between the first wireless access point and the second wireless access point. The estimated distance is based on at least one data set of the plurality of data sets.

An example server for crowdsourcing a determined distance between a first wireless access point to a second wireless access point of an indoor positioning system, according to the disclosure, includes a wireless communications interface, a processing unit communicatively coupled with the wireless communications interface, and a memory coupled to the processing unit. The memory stores executable instructions for causing the processing unit to receive distance estimation data relating to a distance between the first wireless access point to the second wireless access point, determine the distance between the first wireless access point to the second wireless access point, based on the distance estimation data, and send the determined distance via the wireless communications interface.

An example non-transitory computer-readable storage medium, according to the disclosure, has instructions stored thereon for causing a processing unit to obtain a plurality of data sets. Each data set of the plurality of data sets includes data regarding a first Round-Trip Time (RTT) value relating to a distance between a mobile device and a first wireless access point, and a second RTT value relating to a distance between the mobile device and a second wireless access point. The storage medium further includes instructions for sending an estimated distance between the first wireless access point and the second wireless access point, wherein the estimated distance is based on at least one data set of the plurality of data sets.

An example non-transitory computer-readable storage medium, according to the disclosure, has instructions stored thereon for causing a processing unit to receive distance estimation data relating to a distance between first wireless access point and a second wireless access point, determine the distance between the first wireless access point to the second wireless access point, based on the distance estimation data, and send the determined distance via a wireless communications interface An example mobile device for crowdsourcing a determined distance between a first wireless access point to a second wireless access point of an indoor positioning system, according to the disclosure, includes means for obtaining a plurality of data sets. Each data set of the plurality of data sets includes data regarding a first Round-Trip Time (RTT) value relating to a distance between the mobile device and the first wireless access point, and a second RTT value relating to a distance between the mobile device and the second wireless access point. The mobile device further includes means for sending an estimated distance between the first wireless access point and the second wireless access point. The estimated distance is based on at least one data set of the plurality of data sets An example system, according to the disclosure, includes means for receiving distance estimation data relating to a distance between a first wireless access point and a second wireless access point, means for determining the distance between the first wireless access point to the second wireless access point, based on the distance estimation data, and means for sending the determined distance via a wireless communications interface.

Items and/or techniques described herein may provide one or more of the following capabilities, as well as other capabilities not mentioned. Techniques can exploit data from multiple devices to determine distances between wireless APs, which can provide for increased positioning accuracy. Moreover, embodiments can provide distance estimates without inertial measurements or other measurements requiring components that may not be on some mobile devices. These and other embodiments, along with many of its advantages and features, are described in more detail in conjunction with the text below and attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
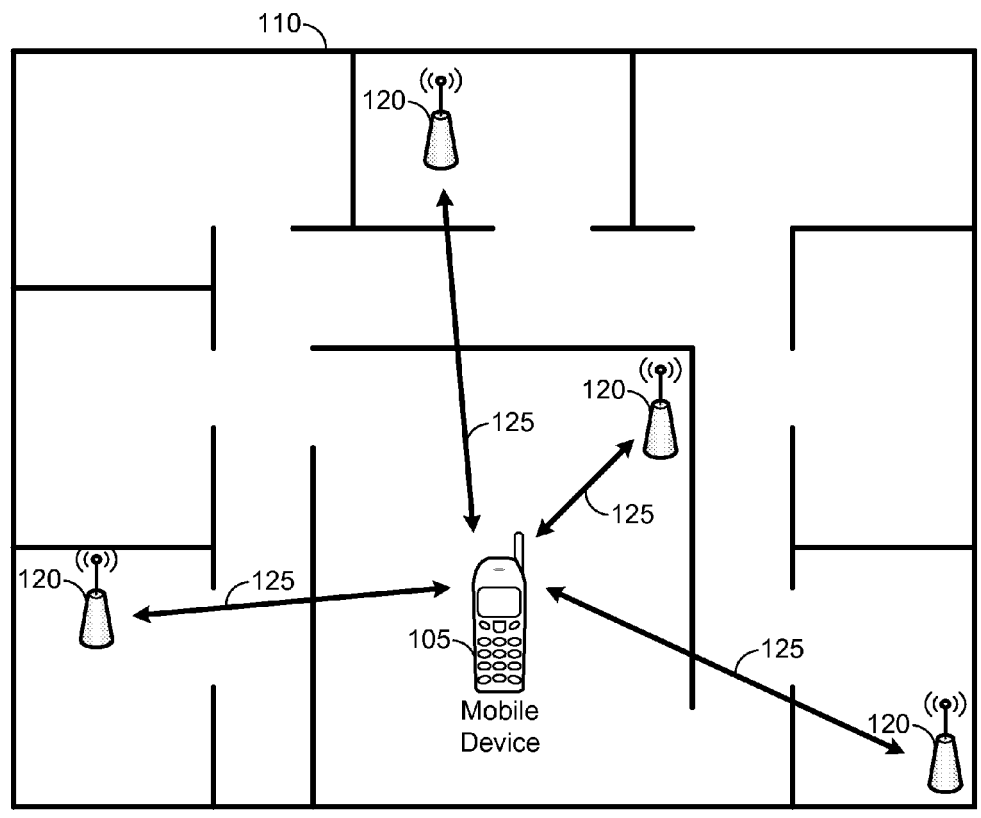
FIG. 1 is a simplified illustration of components of a positioning system, according to one embodiment.

The following description is provided with reference to the drawings, where like reference numerals are used to refer to like elements throughout. While various details of one or more techniques are described herein, other techniques are also possible. In some instances, structures, and devices are shown in block diagram form in order to facilitate describing various techniques. Additionally, well-known elements of the invention will not be described in detail or will be omitted so as not to obscure the relevant details of the invention.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Different techniques disclosed herein may be used by one or more devices in a system for determining the location of a mobile device such as a cell phone, personal digital assistant (PDA), tablet computer, personal media player, gaming device, and the like, according to the desired functionality of the mobile device. For example, some mobile devices may process signals received from a Satellite Positioning System (SPS) to estimate their locations for navigation, social media location information, location tracking, and the like. However, sometimes there are certain areas where navigation signals from an SPS may not be available, such as in certain indoor locations.

To determine its location without SPS signals, a mobile device can utilize alternative means provided in a positioning system. For instance, a mobile device can transmit a signal to a wireless access point (AP) of the positioning system and measure a length of time until a response signal from the wireless AP is received. (As provided herein, a wireless AP may comprise a device that allows wireless communication devices to communicate with a network.) A range from the mobile device to the wireless AP may be determined based upon the measured length of time between transmission of a signal from the mobile device and receipt of a response signal at the mobile device (e.g., round trip time (RTT)). Alternatively, signal strength of a signal received from the AP may be measured and a range from the mobile device to the AP may be estimated based on the measured signal strength (e.g., received signal strength indication (RSSI)). In this manner, a location of the mobile device can be determined.

FIG. 1 is a simplified illustration of components of a positioning system 100, according to one embodiment. The positioning system can include a mobile device 105, and one or more wireless APs 120 in an indoor environment 110. Other components of the positioning system, which are not shown, can include SPS satellites, a mobile network provider, base transceiver stations, a location server, a map server, and the like. Moreover, the positioning system 100 can be integrated into and/or communicatively connected with a communication network, as detailed below. It should be noted that FIG. 1 provides only a generalized illustration of various components, any or all of which may be utilized as appropriate. Furthermore, components may be combined, separated, substituted, and/or omitted, depending on desired functionality. A person of ordinary skill in the art will recognize many modifications to the components illustrated.

In the positioning system 100, a location of the mobile device 105 can be determined using RTT and/or RSSI measurements in a variety of ways. In some embodiments, for example, the location of the mobile device 105 can be calculated using triangulation and/or other positioning techniques, which may utilize RTT and/or RSSI range models. Other embodiments may adaptively change the ranging models, such as, for example, using RTT measurements that are adjusted to accommodate for processing delays introduced by the wireless AP(s) 120. The processing delays may vary among different APs and may also change over time. By using supplemental information, such as, for example, a processing delay estimate, the position may be determined and/or the effects of the processing delays introduced by the wireless APs can be calibrated using iterative techniques.

A mobile device 105 can communicate with the wireless the AP(s) 120 via one or more communication links 125 for wireless voice and/or data communication. The wireless AP(s) 120 also can act as independent sources of position data, e.g., through implementation of trilateration-based procedures based, for example, on RTT and/or RSSI measurements. Further example embodiments of determining position of a mobile device using wireless AP(s) 120 are provided in U.S. patent application Ser. No. 12/622,289, entitled "WIRELESS POSITION DETERMINATION USING ADJUSTED ROUND TRIP TIME MEASUREMENTS," the content of which is hereby incorporated by reference in its entirety. The AP(s) 120 can be part of a Wireless Local Area Network (WLAN) that operates in a building to perform communications over smaller geographic regions than a wide area wireless network (WWAN). The wireless AP(s) 120 can be part of a WiFi network (802.11x), cellular piconets and/or femtocells, Bluetooth network, and the like. The wireless AP(s) 120 can also form part of a Qualcomm indoor positioning system (QUIPS™). Embodiments may include any number of wireless APs 120, any of which may be a moveable node, or may be otherwise capable of being relocated.

As explained in more detail herein below, a single mobile device 105 can take RTT and/or RSSI measurements at different times and/or different locations to facilitate an estimation a distance between wireless APs 120. The mobile device 105 can determine an estimated distance based on the RTT and/or RSSI measurements and/or provide these measurements to a server for determining the distance. Furthermore, a server may obtain distance estimates and/or RTT and RSSI measurements from a plurality of mobile devices to more accurately determine the distance between the wireless APs 120 via crowdsourcing.

Determining the distance between wireless APs 120 in this manner can be beneficial to an indoor positioning system 100 in a variety of ways. It can, for example, help determine the geometry and/or absolute position of the wireless APs, increasing the accuracy of positioning provided by the positioning system 100. A distance determination can also be utilized in the generation of heatmaps used in positioning determinations for mobile devices 105, and distance determinations can be employed by anchor-based positioning algorithms. Furthermore, floor determination (i.e., determining which floor of a multi-story building a wireless AP 120 is located) can benefit from distance determinations. For example, a multidimensional scaling (MDS) approach can rely heavily on information regarding the distances between wireless APs 120.

Figure 2:
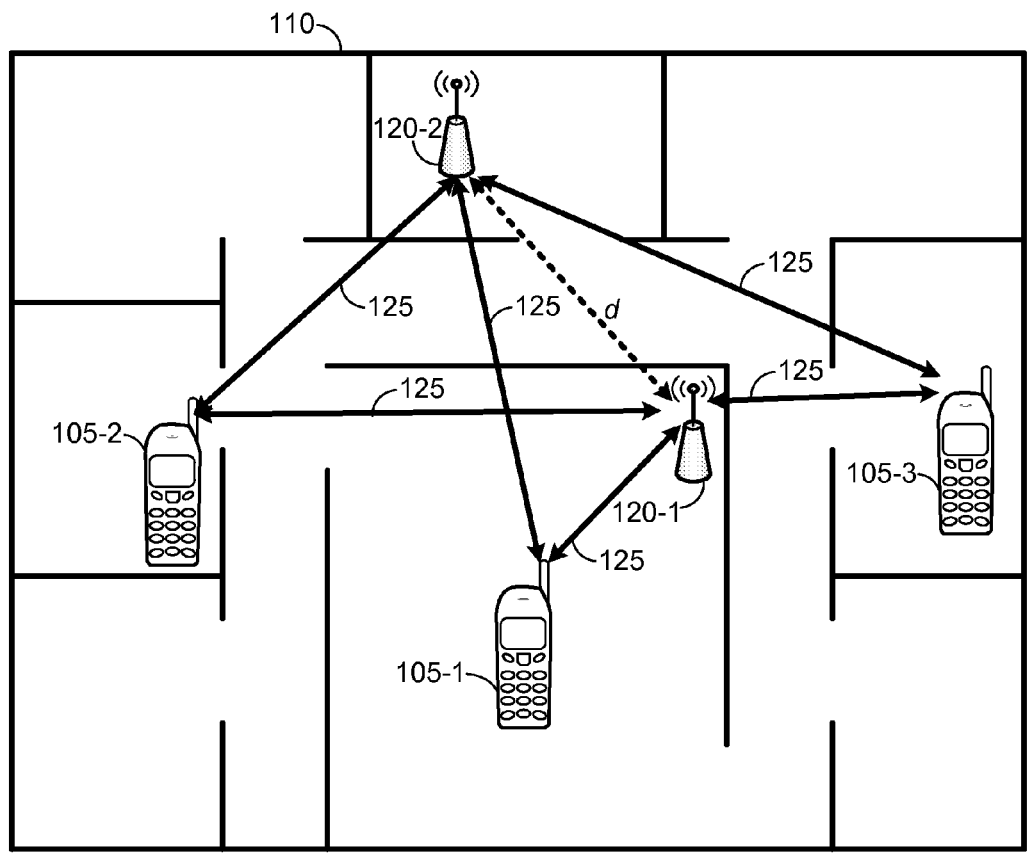
FIG. 2 is another simplified illustration of the embodiment of components the positioning system of FIG. 1 in relation to first and second wireless access points (APs).

FIG. 2 is a simplified illustration of an embodiment of components the positioning system 100 in relation to a first wireless AP 120-1 and a second wireless AP 120-2, to help illustrate how a determination of a distance d between the first wireless AP 120-1 and the second wireless AP 120-2 can be crowdsourced. For example, according to some embodiments, a first mobile device 105-1 proximate to the first wireless AP 120-1 can obtain one or more RSSI and/or RTT measurements relating to the distance between the first mobile device 105-1 and both the first wireless AP 120-1 and the second wireless AP 120-2. Depending on desired functionality, RSSI and/or RTT measurements may be taken periodically (e.g., every 1, 2, 3, 5, 10 seconds, etc.), based on location, performed on demand (e.g., a request made by an application executed by the first mobile device 105-1, a server, and/or first wireless AP 120-1), taken continuously, and the like. The first mobile device 105-1 can then use these measurements to calculate an estimate for distance d between the first wireless AP 120-1 and the second wireless AP 120-2, and send the estimated distance to the wireless AP 120-1. Additionally or alternatively, the first mobile device 105-1 can send the RSSI and RTT measurements to the first wireless AP 120-1 and/or second wireless AP 120-2. Other mobile devices 105-2, 105-3 can also send distance estimation data (e.g., distance estimates, RTT and/or RSSI measurements, etc.), providing a vast set of data from which distance d may be determined.

Thus, in implementation, each of the one or more mobile devices 105 can have a distance estimator implemented in hardware and/or software that uses the mobile device's collected RTT and/or RSSI measurements to estimate distance d. Additionally or alternatively, each mobile device 105 can act as a data collector to serve RTT and/or RSSI measurements to a server-side distance estimator. Any of a variety of distance estimation algorithms can be utilized to determine the distance, as described in further detail below. The resulting distance estimation sent from a mobile device 105 to a server can be a combination of the outputs of these algorithms.

The first wireless AP 120-1 and/or second wireless AP 120-2, which can include, be incorporated into, and/or be communicatively coupled with such a server. The server can receive the distance estimation data (e.g., the processing delay estimate and/or RSSI and RTT measurements), calculate a distance estimate using RSSI and RTT measurements if necessary, determine the (approximate) distance d from a plurality of distance estimates, and/or store the determined distance in a memory (e.g., in a database), which it can maintain and update using on further information regarding the distance d between the first wireless AP 120-1 and the second wireless AP 120-2. Thus, a server can include a server-side distance estimator, implemented in hardware and/or software, to collect distance estimation data from one or more mobile devices 105. The distance estimation data can include raw data RSSI and/or RTT measurements and/or inter-AP distance estimates. The server can then analyze distance estimation data to determine the distance d.

Depending on desired functionality, embodiments can include additional features. For example, a server can, via the first wireless AP 120-1 and/or second wireless AP 120-2, propagate the determined distance d to one or more of the mobile devices 105 and/or other devices to help further increase the accuracy of location determinations by enabling the mobile devices 105 to more accurately determine the relative and/or absolute positions of the first wireless AP 120-1 and the second wireless AP 120-2. Additionally or alternatively, the first mobile device 105-1 can send the distance estimate via other communication channels, such as direct peer-to-peer communication. By crowdsourcing information in this manner, the positioning system 100 can provide an accurate determination of the distances between wireless APs 120 without the need for war-driving or war-walking (e.g., manual, deliberate signal collection), which can be expensive and does not scale easily. Even so, embodiments can provide for a determination of one or more distances between wireless APs 120 by utilizing a single mobile device 105 that takes RTT and RSSI measurements at various times in various locations.

A distance estimate based on RTT and/or RSSI measurements can be determined using any of a variety of techniques. Examples of such techniques are illustrated in FIGS. 3-4.

Figure 3:
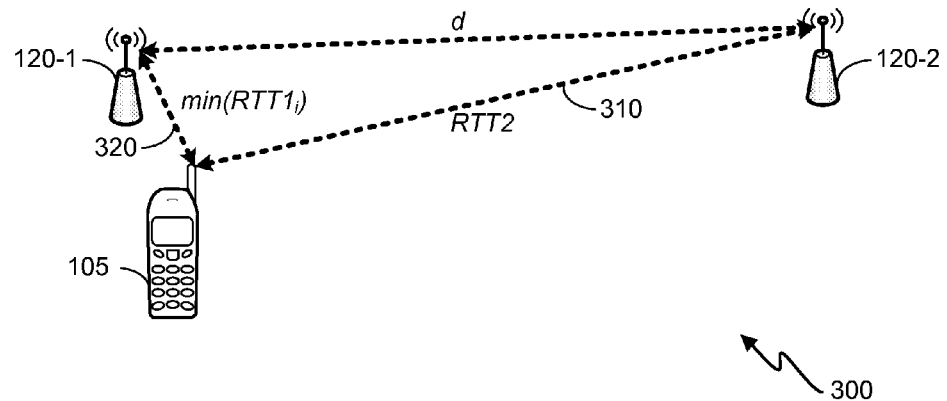
FIGS. 3-4 are simplified illustrations showing techniques for estimating a distance between a first and second wireless APs.
Figure 4:
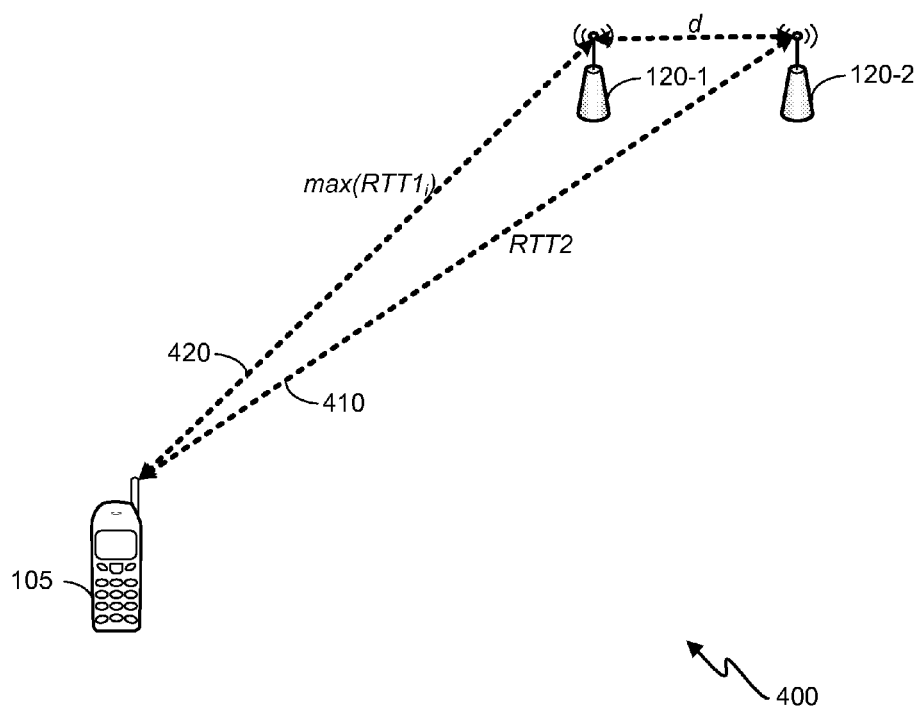

FIG. 3 illustrates an embodiment of a first technique 300 for estimating a distance d between a first wireless AP 120-1 and a second wireless AP 120-2 when a mobile device 105 is close to the first wireless AP 120-1. When a distance 320 between the mobile device 105 and the first wireless AP 120-1 is small, the distance d between a first wireless AP 120-1 and a second wireless AP 120-2 is approximately the distance 310 between the mobile device 105 and the second wireless AP 120-2. This latter distance 310 can be determined using an RTT measurement RTT2 taken between the mobile device 105 and the second wireless AP 120-2 while the mobile device is close to the first wireless AP 120-1.

RSSI and/or RTT measurements can be used to help ensure the mobile device 105 is close to the first wireless AP 120-1 and/or within the line of sight of either or both wireless APs 120. In particular, some embodiments may ignore RTT measurements in which the value of a related RSSI measurement, taken at approximately the same time (and therefore at approximately the same location) does not exceed a certain threshold. For example, some embodiments may only utilize RTT measurements in which related RSSI measurements exceed a value of −40 dBm. Other embodiments may have other threshold values, which can vary based on hardware variations between wireless APs 120 and/or mobile devices 105. Accordingly, some embodiments may have a threshold value for RSSI measurements anywhere from −35 dBm to −45 dBm. Other embodiments may use a threshold value outside this range. For example, in some embodiments, a threshold can be set as small as −85 dBm or less.

Additionally or alternatively, embodiments may impose a threshold on RTT measurements to help ensure the mobile device's proximity to the first wireless AP 120-1. For example, if the processing delay (i.e. turnaround calibration function (TCF)) of the first wireless AP 120-1 is 1600 ns, then a threshold RTT value could be set at 1610 ns. Because 10 ns corresponds to approximately 3 m of range, RTT measurements in which the mobile device 105 is more than 3 m away from the first wireless AP 120-1 would be ignored. Depending on desired functionality, embodiments may impose an RTT measurement threshold of greater than or less than 10 ns (in addition to a processing delay). As indicated previously, this RTT threshold can be utilized in addition or as an alternative to a threshold imposed on RSSI measurements, such that when both RTT and RSSI thresholds are imposed, RTT measurements will be ignored if the RTT measurements are greater than the RTT threshold and/or related RSSI measurements are do not exceed the RSSI threshold.

Because a distance estimate is most accurate when the mobile device 105 is closest to the first wireless AP 120-1, the device making the distance estimate (e.g., the mobile device 105 and/or server) can analyze RSSI and/or RTT measurements taken over a period of time to determine which measurements correspond to the point at which the mobile device 105 was closest to the first wireless AP 120-1. To do this, the mobile device 105 can produce a plurality of data sets over a period of time—periodically, continuously, or after certain triggering events—where each data set includes RTT measurements between the mobile device 105 and both the first wireless AP 120-1 and the second wireless AP 120-2 at a certain point in time. The creation of the plurality of data sets can be triggered by a distance from a wireless AP 120, by a request from a server and/or wireless AP 120, or other triggering event. In some embodiments, a server or other requesting device may send instructions informing the mobile device 105 when to take the plurality of data sets. Data sets can be relative to each other (e.g., a second data set is obtained after a certain time period and/or estimated distance has elapsed from obtaining a first data set). In embodiments utilizing RSSI measurement data, the data set can also include one or more RSSI values related to either or both of the RTT measurements. The plurality of data sets can be stored and analyzed—periodically, continuously, or after certain triggering events—to determine which data set includes the RTT measurements and/or RSSI measurements indicating the point at which the mobile device 105 was closest to the first wireless AP 120-1. The plurality of data sets can, for example, be triggered The subsequent steps are straightforward. After finding the minimum RTT value min(RTT1$_i$) corresponding to the time at which the distance 320 between the mobile device 105 and the first wireless AP 120-1 is smallest, the distance d between a first wireless AP 120-1 and a second wireless AP 120-2 can be estimated as the distance 310 corresponding to the RTT measurement RTT2 taken between the mobile device 105 and the second wireless AP 120-2 at approximately the same time.

Because the RTT measurement RTT2 can include a processing delay of the second wireless AP 120-2, the processing delay can be subtracted from the RTT measurement RTT2 to estimate the time of flight related to distance d. If this processing delay is not already known, it can be estimated from a minimum value min(RTT2$_i$) (not shown) corresponding to the time at which the mobile device 105 is closest to the second wireless AP 120-2. In other words, nearly all of the value of an RTT measurement taken when a mobile device 105 is close to the second wireless AP 120-2 is due to the processing delay of the second wireless AP 120-2 rather than a time of flight, so the RTT measurement can serve as an estimation of the processing delay. This value can also be obtained via crowdsourcing. Further details for estimating the processing delay of a wireless AP 120 in this manner are provided in Processing Delay Estimate Application, which is incorporated by reference hereinabove.

With the estimated processing delay value of min(RTT2$_i$), the time of flight related to distance d can be determined by subtracting min(RTT2$_i$) from the RTT measurement RTT2. An estimate for distance d can then be calculated by multiplying the time of flight with the speed of light.

FIG. 4 illustrates an embodiment of a second technique 400 for estimating a distance d between a first wireless AP 120-1 and a second wireless AP 120-2 when a mobile device 105 is distant from both the first wireless AP 120-1 and the second wireless AP 120-2. When a distance 420 between the mobile device 105 and the first wireless AP 120-1 is large, the angle between the mobile device 105 and the first wireless AP 120-1 and a second wireless AP 120-2 is very small, thereby making the mobile device 105, first wireless AP 120-1 and second wireless AP 120-2 approximately collinear. Accordingly, distance d between a first wireless AP 120-1 and a second wireless AP 120-2 can be estimated by subtracting the distance 420 between the mobile device 105 and the first wireless AP 120-1 from the distance 410 between the mobile device 105 and the second wireless AP 120-1. Alternatively, as detailed below, the calculation can be performed using the equivalents of these distances in the time domain using RTT measurements.

Similar to the first technique 300 illustrated in FIG. 3, the second technique 400 shown in FIG. 4 can utilize thresholds for RSSI and/or RTT measurements to help ensure the mobile device 105 is within the line of sight of the wireless APs 120 and at a sufficiently distant location from the first wireless AP 120-1. In particular, some embodiments may ignore RTT measurements in which the value of a related RSSI measurement does not exceed a certain threshold, to help ensure the reliability of the RTT measurement. For example, some embodiments may only utilize RTT measurements in which related RSSI measurements exceed a value of −80 dBm. Again, embodiments may have other threshold values, which can vary based on hardware variations between wireless APs 120 and/or mobile devices 105. Accordingly, some embodiments may have a threshold value for RSSI measurements anywhere from −75 dBm to −85 dBm. Other embodiments may use a threshold value outside this range.

An upper and/or lower threshold can also be imposed on RTT measurements, the lower threshold to help ensure the mobile device 105 is sufficiently distant from the first wireless AP 120-1, and the upper threshold to help ensure the accuracy of the RTT measurement. In some embodiments, an upper threshold can simply be determined based on known reliability of RTT measurements. For example, if RTT data is known to be unreliable beyond 200 m, then an upper threshold for an RTT measurement could be the corresponding time of flight, 667 ns, plus the processing delay of the first wireless AP 120-1.

Additionally or alternatively, for indoor positioning systems in which data about a building is available, the upper and/or lower threshold for RTT measurements can be determined based on map data. For example, although a default upper threshold for an RTT measurement could correspond to a distance of 200 m, embodiments may utilize map data to determine that the mobile device 105 would be outside the building if more than 50 m away from the first wireless AP 120-1. In such as case, the upper threshold for an RTT measurement could be set to correspond to a distance of 50 m. Some embodiments may utilize map data to set other thresholds for RTT and/or RSSI m in a similar manner.

Similar to the first technique 300 illustrated in FIG. 3, the second technique 400 shown in FIG. 4 can utilize can analyze multiple data sets with RTT and/or RSSI measurements taken over a period of time to determine which measurements correspond to the point at which the mobile device 105 was farthest from the first wireless AP 120-1. To estimate distance d by subtracting distance 420 from distance 410 as indicated above, the maximum RTT value max(RTT1$_i$) corresponding to the time at which the mobile device 105 is farthest from the first wireless AP 120-1 can be identified and subtracted from the corresponding RTT measurement RTT2 in the same data set. Here, the RTT measurement RTT2 relates to a distance 410 between the mobile device 105 and the second wireless AP 120-2. Distance d can be calculated from the resulting time of flight.

Because maximum RTT value max(RTT1$_i$) and RTT measurement RTT2 both include a processing delays of the first wireless AP 120-1 and the second wireless AP 120-2, respectively, the processing delays can be taken into account when estimating the time of flight related to distance d. If these processing delays are not already known, they can be estimated using the techniques described earlier in reference to FIG. 3.

Depending on desired functionality, distance estimates such as those resulting from the distance estimation techniques illustrated in FIGS. 3-4 can be provided to a server by one or more mobile devices 105, and/or made by a server that receives raw RSSI and/or RTT measurements from one or more mobile devices 105. Some embodiments may provide for both, where some devices and/or device types provide distance estimates to a server, while others provide raw RSSI and/or RTT measurements. The type of data provided by the mobile device may depend on hardware features (e.g., battery life, processing capabilities, etc.), data plans, and/or other factors.

The server can then use a plurality of distance estimates to determine the distance d between the first wireless AP 120-1 and the second wireless AP 120-2. Outlying distance estimates, for example, can be ignored. The server can then calculate the distance d by averaging the distance estimates that are not ignored.

Confidence values associated with one or more distance estimates may also be used in the determination of distance d. A server can then calculate a weighted mean and/or weighted average of distance estimates, giving more weight to distance estimates with higher confidence values. For example, some embodiments may provide for a standard deviation to be associated with each distance estimate, where the standard deviation is derived from multiple RTT measurement of a single mobile device. In such embodiments, a server can give distance estimates with smaller standard deviations more weight than those with larger standard deviations. Other weighting factors such as mobile device type could also be used.

Different types of mobile devices 105, such as different makes and models of mobile phones, can measure RSSI and/or RTT differently. These differences can stem from differences in antennas, chipsets, and/or other hardware features. There can also be differences in the reliability of RSSI and/or RTT measurements, as well as any resulting distance estimates. A server can be configured to compensate these differences. In some embodiments, for example, a mobile device 105 can provide a server with information indicative of one or more hardware features of the mobile device so that distance estimation data (e.g., RSSI measurements, RTT measurements, and/or distance estimates) received by the server from the device can be adjusted accordingly. Example hardware features could include the make and/or model of the device, a chipset, antenna, and/or the like. The server can then utilize a lookup table to determine how the distance estimation data received from that mobile device should be adjusted, if at all.

Depending on desired functionality, the server can maintain and update a value for the determined distance d, which it can also propagate to the mobile devices 105 and/or other location-determining devices. The this value can, for example, be calculated and updated periodically, upon certain triggering events (e.g., upon network setup, by request from a software application, upon determining that a wireless access point has been relocated or replaced, etc.), or continuously. To that end, a server can send a flag or other indicator to the one or more mobile devices indicating that distance estimation data regarding distance d is needed.

Conversely, embodiments may provide for a mechanism to reduce or stop the flow of distance estimation data to a server. For example, a server may determine that a point of data saturation has been reached, at which point a value for the determined distance d has not changed for a certain period of time or is unlikely to change regardless of any additional distance estimation data received. The server can then send a flag or other indicator to the one or more mobile devices indicating that further distance estimation data regarding distance d is not needed.

Figure 5:
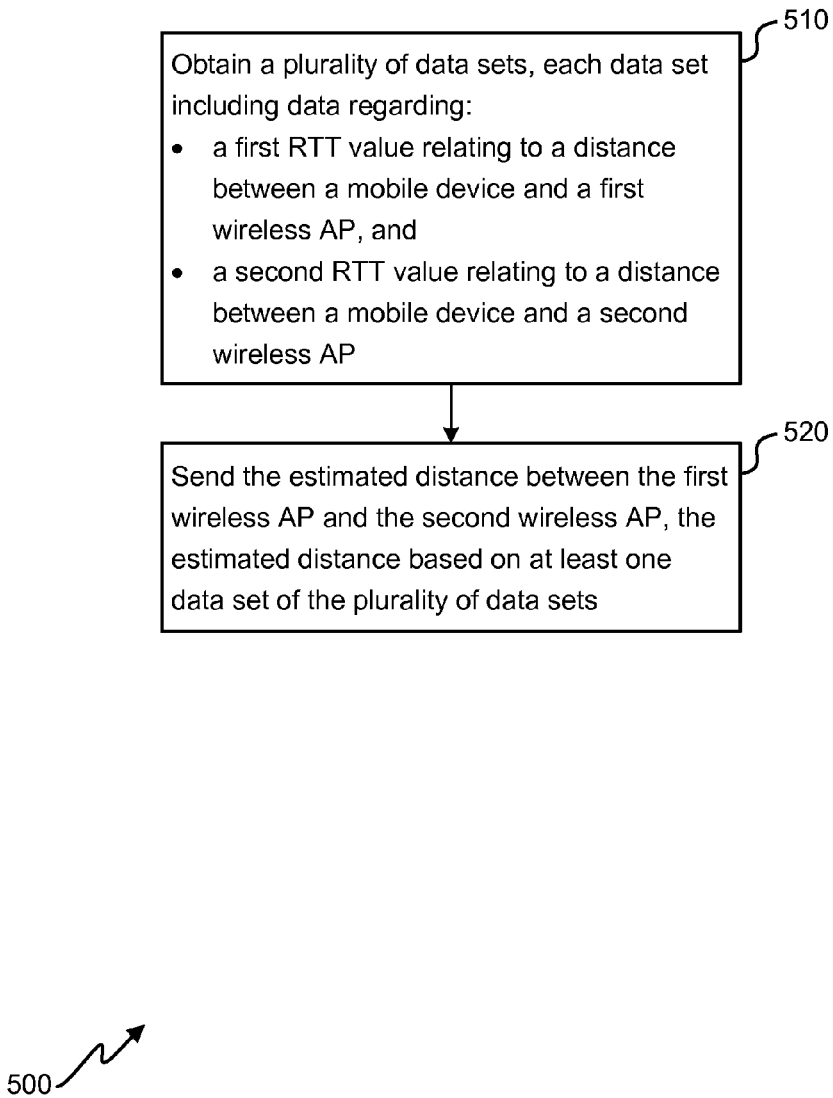
FIG. 5 is a simplified flow chart of a process for providing an estimated distance between a first wireless access point to a second wireless access point using a mobile device, according to one embodiment.

FIG. 5 is a simplified flow chart of a process 500 for providing an estimated distance between a first wireless access point to a second wireless access point using a mobile device, according to one embodiment. The process 500 can be executed by a mobile device, such as the mobile device 105 of FIGS. 1-4, which can execute a client application to perform some or all of the process 500. Means for performing some or all components shown in FIG. 5 can include, for example, specialized and/or generalized hardware programmed and/or otherwise configured to perform the components shown. Such means are described in further detail below with regard to FIG. 7.

The process 500 can begin at block 510 by obtaining a plurality of data sets, where each data set includes data regarding a first RTT value relating to a distance between a mobile device and the first wireless AP, and a second RTT value relating to a distance between a mobile devices and the second wireless AP. The RTT values of each of the plurality of data sets can represent RTT measurements taken at approximately the same time and location. Data sets may further include one or more RSSI values related to either or both of the first RTT value or the second RTT value. The RTT measurements of the data sets can be taken periodically, at predetermined times, upon request (e.g., from a separate device, such as a wireless AP and/or server), continuously, and/or as needed, depending on desired functionality. For embodiments in which a separate device sends a request to a mobile device to provide the RSSI and/or RTT measurements, the mobile device and the requesting device can undergo a data exchange to authenticate and/or authorize the requesting device for such measurements. Furthermore, the plurality of data sets may be subject to thresholds for RTT and/or RSSI values, such that, for each data set of the plurality of data sets, the first RTT value is below a threshold value, an RSSI value related to either or both of the first RTT value or the second RTT value exceeds a threshold value, etc.

At block 520, the estimated distance between the first wireless AP and the second wireless AP is sent, where the estimated distance is based on at least one data set of the plurality of data sets. The distance estimate can be determined using RTT and/or RSSI values from the plurality of data sets.

As indicated above, one method of making a distance estimate can include determining a first data in which the first RTT value is the lowest first RTT value of the plurality of data sets. The second RTT value of the first data set is then determined, and the distance between the first wireless AP and the second wireless AP is estimated by subtracting a processing delay from the second RTT value of the first data set. The resulting time of flight can be multiplied by the speed of light to provide the distance estimate. If the processing delay of the second wireless AP is not known, the mobile device can determine a second data set having the lowest second RTT value of the plurality of data sets. The processing delay can be estimated as approximately the second RTT value of the second data set.

Another method of making a distance estimate can include determining a first data set having the highest first RTT value of any data set of the plurality of data sets, indicating when the mobile device is farthest from the first wireless AP. The second RTT value of the first data set is determined, and the distance between the first wireless AP and the second wireless AP can be estimated by subtracting, from the second RTT value of the first data set, the first RTT value of the first data set, and a processing delay of the second wireless AP. Again, the processing delay can be estimated in the manner described above, using the lowest second RTT value of the plurality of data sets.

It should be appreciated that the specific steps illustrated in FIG. 5 provide an example process 500 for providing an estimated distance between a first wireless access point to a second wireless access point using a mobile device. Alternative embodiments may include alterations to the embodiments shown. Furthermore, additional features may be added or removed depending on the particular applications. One of ordinary skill in the art would recognize many variations, modifications, and alternatives.

Figure 6:
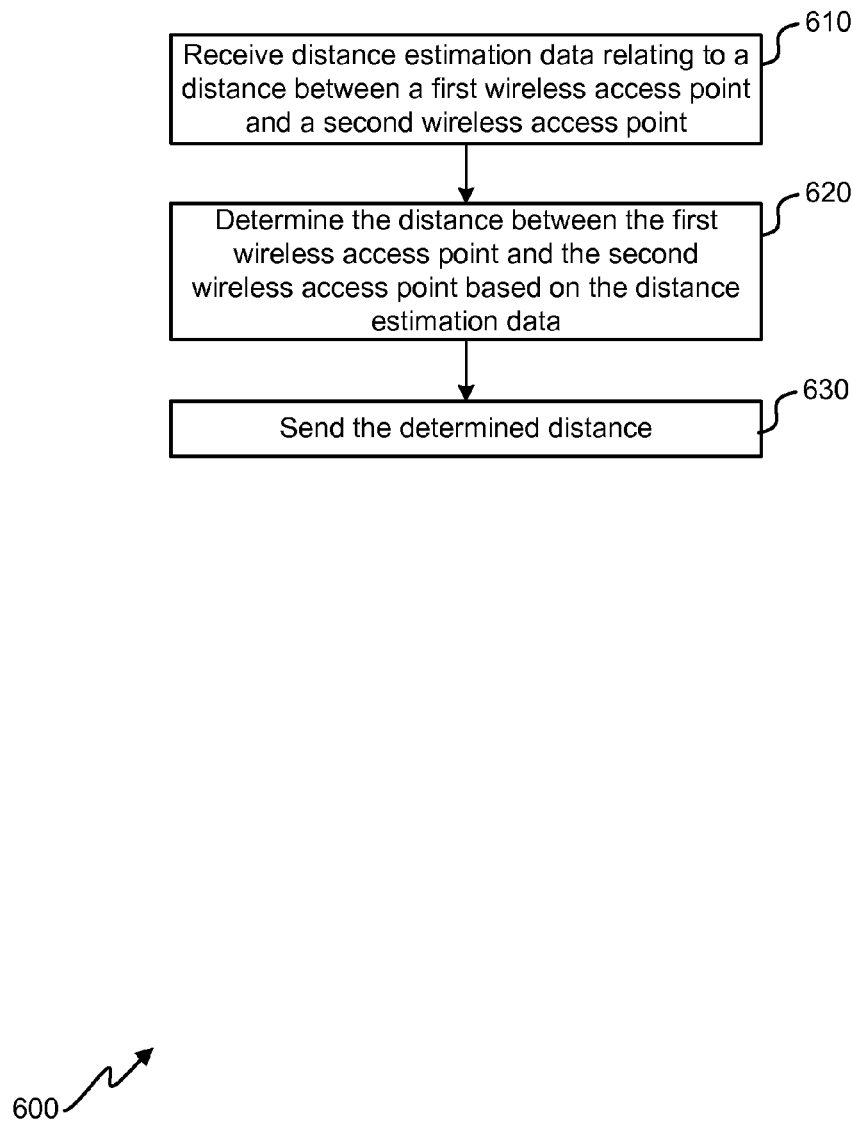
FIG. 6 is a simplified flow diagram of a process for crowd-sourcing a determined distance between a first wireless access point to a second wireless access point of an indoor positioning system, according to one embodiment.

FIG. 6 is a simplified flow diagram of a process 600 for crowdsourcing a determined distance between a first wireless access point to a second wireless access point of an indoor positioning system, according to one embodiment. The process 600 can be executed by a server, which may be executed by a computing device integrated and/or communicatively coupled with one or more wireless APs, such as the wireless APs 120 of FIGS. 1-4. Additionally or alternatively, the process 600 may be performed by one or more mobile devices communicating with each other in, for example, an ad-hoc and/or peer-to-peer network. Means for performing some or all components shown in FIG. 6 can include, for example, specialized and/or generalized hardware programmed and/or otherwise configured to perform the components shown. Such means are described in further detail below with regard to FIG. 8.

The process 600 can begin at block 610 by receiving distance estimation data relating to a distance between a first wireless access point and a second wireless access point. Distance estimation data can be received from one or more mobile devices. Depending on implementation, distance estimation data can include RSSI measurements, RTT measurements, and/or distance estimates, as well as supplementary information, such as device type of mobile device, time stamp, MAC address, and the like, which can be used in distance estimation.

Various types of events can trigger the beginning of the process 600. As indicated previously, one or more mobile devices may send distance estimation data periodically and/or a predetermined times. Additionally or alternatively, a server and/or access point may send a request to the one or more mobile devices for distance estimation data based on a determination that the distance between the first and second wireless access points needs to be estimated. This determination can be based on an indicator that the first and/or second wireless access point has been installed or moved, a manual request (e.g., by a technician), a request from an application, a scheduled event, etc. In such embodiments, a server can send a request to a mobile device for distance estimation data. The request can include and/or accompany an exchange of data between the server and mobile device to authenticate and/or authorize the server to receive the data. After sending a proper request, the server can receive distance estimation data from the mobile device. The server can follow similar steps to receive distance estimation data from a plurality of mobile devices.

At block 620, the distance between the first wireless access point and the second wireless access point is determined, based on the distance estimation data. Such a determination can include calculating an average, median, mean, or other value based on a plurality of distance estimates. For instances in which each of a plurality of distance estimates has a confidence value, determining the distance can include computing a weighted average of a plurality of distance estimates. Additionally or alternatively, embodiments can include calculating a statistical center value estimate, in which a center value is determined after outlying values are discarded or ignored.

At block 630, the determined distance is then sent. The processing delay estimate can be sent, for example, to one or more mobile devices to increase the accuracy of positioning calculations based on RTT measurements with the first wireless AP and/or the second wireless AP. As with other communication described herein, the determined distance can be sent at scheduled times, periodically, upon request by a client (mobile device), and/or pushed out by a server. The server may first send an indication to more or more clients that a distance has been determined and/or updated, in which case the one or more clients may subsequently send a request for the value of the determined distance. In some embodiments, a data exchange between the client(s) and the server can take place to authenticate and/or authorize the client(s) to receive the value of the determined distance. The server may also update a stored value based on the determined distance. For example, the server may maintain a prior determined distance value in a database or other data structure stored in a memory, which the server can update when determining the distance based on the distance estimation data.

It should be appreciated that the specific steps illustrated in FIG. 6 provide an example process 600 for crowdsourcing a determined distance between a first wireless access point to a second wireless access point of an indoor positioning system, according to one embodiment. Alternative embodiments may include alterations to the embodiments shown. Furthermore, additional features may be added or removed depending on the particular applications. One of ordinary skill in the art would recognize many variations, modifications, and alternatives.

Figure 7:
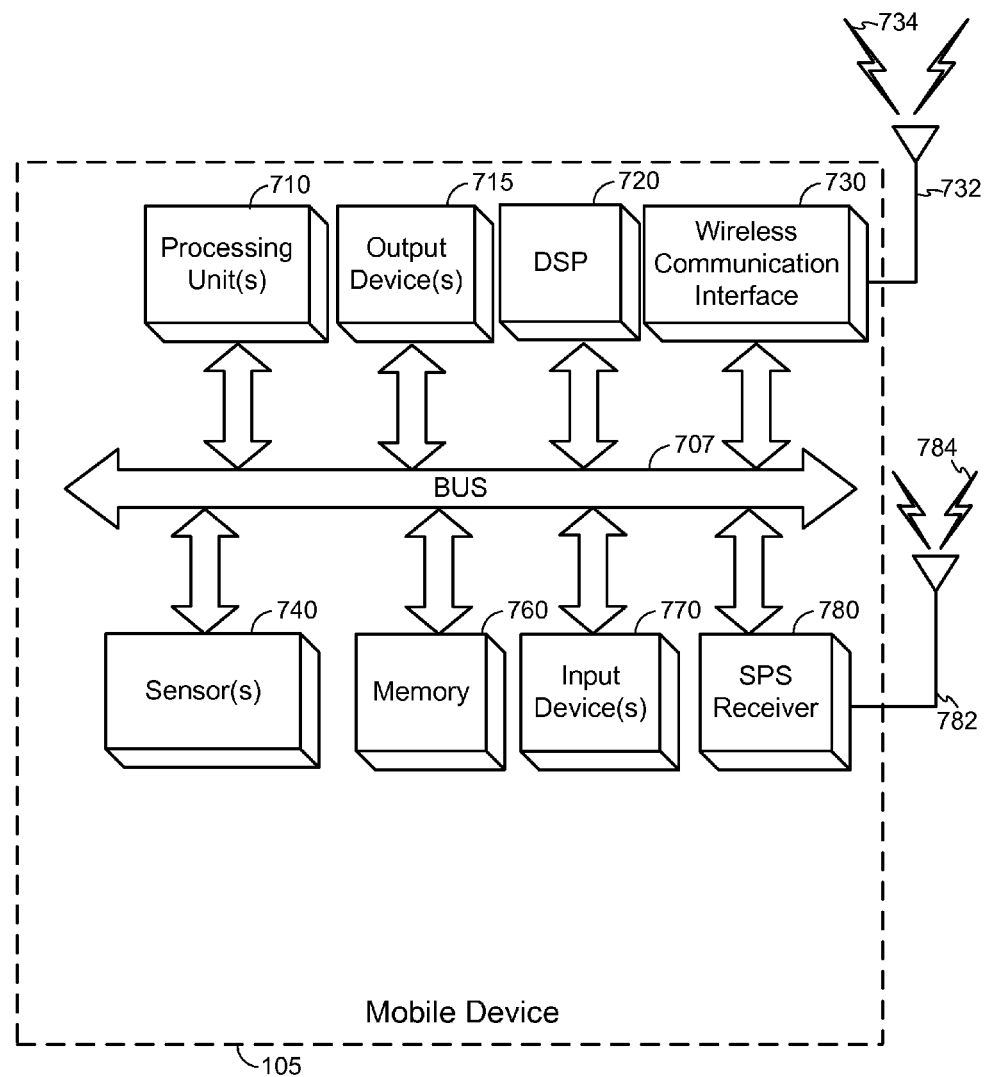
FIG. 7 is a block diagram an embodiment of a mobile device.

FIG. 7 illustrates an embodiment of a mobile device 105, which can be utilized in the positioning system 100 of FIGS. 1-2, to perform the methods provided by various other embodiments, such as the process 500 illustrated in FIG. 5. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

It can also be noted that some or all of the components of the mobile device 105 shown in FIG. 7 can be utilized in other computing systems described herein, such as wireless AP(s) 120 of FIGS. 1-4. In these other systems, as well as the mobile device 105, it can be noted that components illustrated by FIG. 7 can be localized to a single device and/or distributed among various networked devices, which may be disposed at different physical locations.

The mobile device 105 is shown comprising hardware elements that can be electrically coupled via a bus 707 (or may otherwise be in communication, as appropriate). The hardware elements may include a processing unit(s) 710 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein, including method illustrated in FIG. 5. As shown in FIG. 7, some embodiments may have a separate DSP 720, depending on desired functionality. The mobile device 105 also can include one or more input devices 770, which can include without limitation a touch screen, a touch pad, microphone, button(s), dial(s), switch(es), and/or the like; and one or more output devices 715, which can include without limitation a display, light emitting diode (LED), speakers, and/or the like.

The mobile device 105 might also include a wireless communication interface 730, which can include without limitation a modem, a network card, an infrared communication device, a wireless communication device, and/or a chipset (such as a Bluetooth™ device, an IEEE 802.11 device, an IEEE 802.15.4 device, a WiFi device, a WiMax device, cellular communication facilities, etc.), and/or the like. The wireless communication interface 730 may permit data to be exchanged with a network, wireless APs, other computer systems, and/or any other electronic devices described herein. The communication can be carried out via one or more wireless communication antenna(s) 732 that send and/or receive wireless signals 734.

Depending on desired functionality, the wireless communication interface 730 can include separate transceivers to communicate with base transceiver stations (e.g., base stations of a cellular network) and APs (e.g., AP(s) 120 of FIGS. 1-4). These different data networks can include a wide area wireless network (WWAN), a wireless local area network (WLAN), a wireless personal area network (WPAN), and the like. The term "network" and "system" as used herein may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 702.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may implement Long Term Evolution (LTE), LTE Advanced, and so on. LTE, LTE Advanced, GSM, and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be an IEEE 702.11x network, and a WPAN may be a Bluetooth network, an IEEE 702.15x, or some other type of network. The techniques described herein may also be used for any combination of WWAN, WLAN and/or WPAN.

The mobile device 105 can further include sensor(s) 740. Such sensors can include, without limitation, one or more accelerometer(s), gyroscope(s), camera(s), magnetometer(s), altimeter(s), microphone(s), proximity sensor(s), light sensor(s), and the like. Some or all of the sensor(s) 740 can be utilized, among other things, for dead reckoning calculations to complement and/or further improve the accuracy of location determinations. That said, as indicated previously, techniques for inter-AP estimation provided herein can utilize mobile devices with no sensor(s) 740 or other specialized components for location detection.

Embodiments of the mobile device may also include a Satellite Positioning System (SPS) receiver 780 capable of receiving signals 784 from one or more SPS satellites using an SPS antenna 782. Such positioning can be utilized to complement and/or incorporate the techniques described herein. The SPS receiver 780 can extract a position of the mobile device, using conventional techniques, from SPS satellite vehicles (SVs) of an SPS system, such as Global Navigation Satellite System (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 780 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 105 may further include and/or be in communication with a memory 760. The memory 760 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 760 of the mobile device 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 5, might be implemented as code and/or instructions executable by the mobile device 105 (and/or a processing unit within a mobile device 105) (and/or another device of a positioning system). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 8:
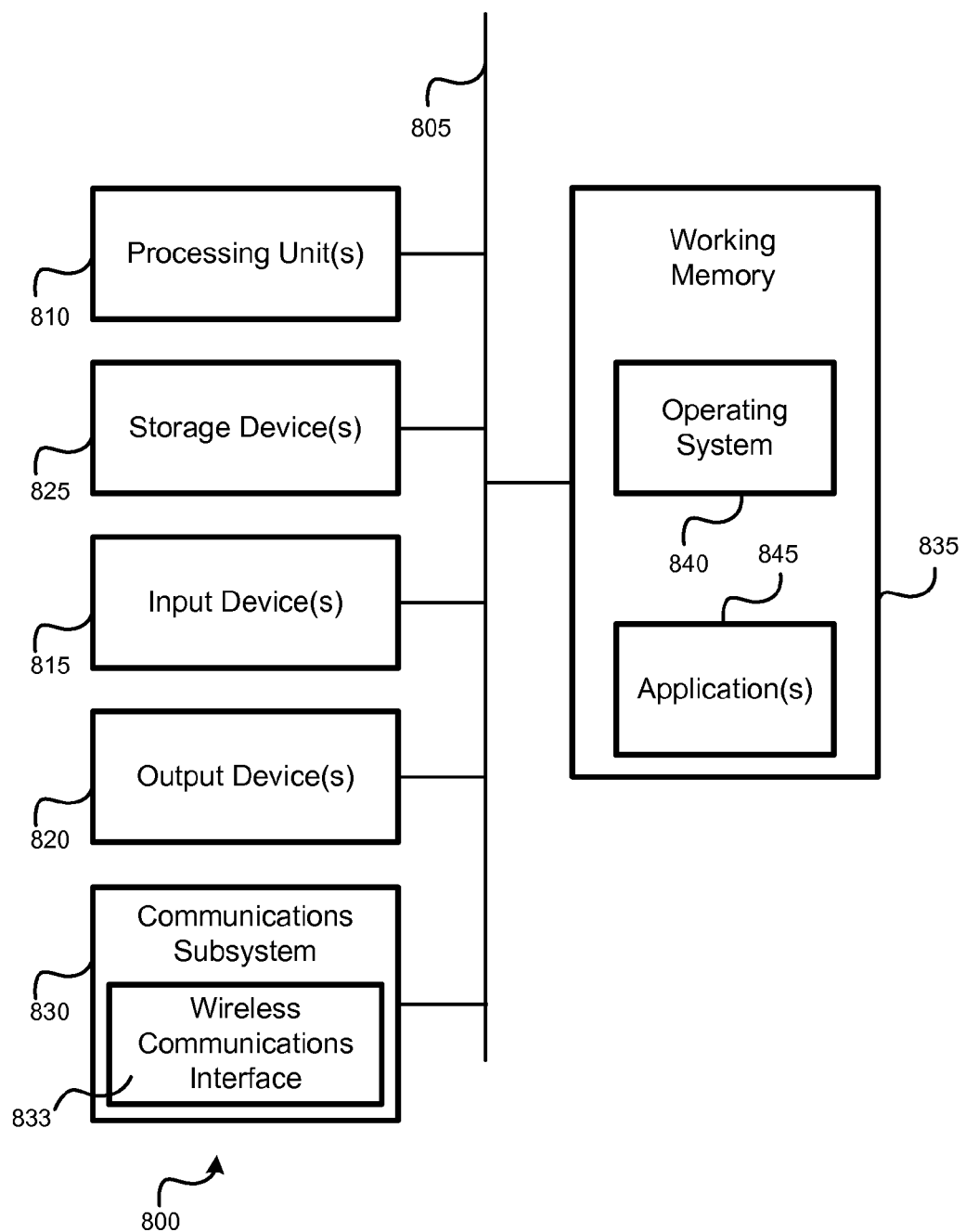
FIG. 8 is a block diagram an embodiment of a computer system.

FIG. 8 illustrates an embodiment of a computer system 800, which may be incorporated, at least in part, into devices such the AP(s) 120 of FIGS. 1-4 and/or a server incorporated and/or communicatively connected therewith, as described herein. FIG. 8 provides a schematic illustration of one embodiment of a computer system 800 that can perform the methods provided by various other embodiments, such as the method described in relation to FIG. 6. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different physical locations.

The computer system 800 is shown comprising hardware elements that can be electrically coupled via a bus 805 (or may otherwise be in communication, as appropriate). The hardware elements may include processing unit(s) 810, which can include without limitation one or more general-purpose processors, one or more special-purpose processors (such as digital signal processing chips, graphics acceleration processors, and/or the like), and/or other processing structure, which can be configured to perform one or more of the methods described herein, including the method illustrated in FIG. 6. The computer system 800 also can include one or more input devices 815, which can include without limitation a mouse, a keyboard, a camera, a microphone, other biometric sensors, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include wireless communication technologies managed and controlled by a wireless communication interface 833, as well as wired technologies. As such, the communications subsystem can include a modem, a network card (wireless or wired), an infrared communication device, a wireless communication device, and/or a chipset (such as a Bluetooth™ device, an IEEE 802.11 device, an IEEE 802.15.4 device, a WiFi device, a WiMax device, cellular communication facilities, UWB interface, etc.), and/or the like. The communications subsystem 830 may include one or more input and/or output communication interfaces, such as the wireless communication interface 833, to permit data to be exchanged with a network, mobile devices (such as the mobile devices 105 of FIGS. 1-4 and 7), other computer systems, and/or any other electronic devices described herein.

In many embodiments, the computer system 800 will further comprise a working memory 835, which can include a RAM or ROM device, as described above. Software elements, shown as being located within the working memory 835, can include an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 6, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for providing an estimated distance between a first wireless access point and a second wireless access point using a mobile device, the method comprising:
   obtaining, with the mobile device, a plurality of data sets, wherein each data set of the plurality of data sets includes data regarding:
      a first Round-Trip Time (RTT) value relating to a distance between the mobile device and the first wireless access point; and
      a second RTT value relating to a distance between the mobile device and the second wireless access point;
   determining the estimated distance between the first wireless access point and the second wireless access point by:
      determining a first data set having a lowest first RTT value of any data set of the plurality of data sets;
      determining the second RTT value in the first data set; and
      estimating the distance between the first wireless access point and the second wireless access point by subtracting a processing delay from the second RTT value in the first data set; and
   sending, with the mobile device, the estimated distance between the first wireless access point and the second wireless access point.

2. The method of claim 1, further comprising determining, for each data set of the plurality of data sets, that a Received Signal Strength Indication (RSSI) value related to either or both of the first RTT value or the second RTT value exceeds a threshold value.

3. The method of claim 1, further comprising determining, for each data set of the plurality of data sets, that the first RTT value is below a threshold value.

4. The method of claim 1, further comprising:
determining a second data set having a lowest second RTT value of any data set of the plurality of data sets; and
determining the processing delay based on the second RTT value of the second data set.

5. A method for providing an estimated distance between a first wireless access point and a second wireless access point using a mobile device, the method comprising:
obtaining, with the mobile device, a plurality of data sets, wherein each data set of the plurality of data sets includes data regarding:
a first Round-Trip Time (RTT) value relating to a distance between the mobile device and the first wireless access point; and
a second RTT value relating to a distance between the mobile device and the second wireless access point;
determining the estimated distance by:
determining a first data set having a highest first RTT value of any data set of the plurality of data sets;
determining the second RTT value in the first data set; and
estimating the distance between the first wireless access point and the second wireless access point by subtracting, from the second RTT value in the first data set:
the first RTT value in the first data set, and
a processing delay; and
sending, with the mobile device, the estimated distance between the first wireless access point and the second wireless access point.

6. The method of claim 5, further comprising:
determining a second data set having a lowest second RTT value of any data set of the plurality of data sets; and
determining the processing delay based on the second RTT value of the second data set.

7. The method of claim 1, further comprising sending a confidence value associated with the estimated distance.

8. A method for crowdsourcing a determined distance between a first wireless access point and a second wireless access point of an indoor positioning system, the method comprising:
receiving distance estimation data comprising:
at least one distance estimate of a distance between the first wireless access point and the second wireless access point, and
at least one confidence value corresponding to the at least one distance estimate;
determining the distance between the first wireless access point and the second wireless access point based on the at least one distance estimate and the at least one confidence value; and
sending the determined distance via a wireless communications interface;
wherein:
the distance estimation data comprises a plurality of distance estimates;
each distance estimate of the plurality of distance estimates has a confidence value; and
determining the distance comprises determining, based on the confidence value of each distance estimate of the plurality of distance estimates, a weighted average of the plurality of distance estimates.

9. The method of claim 8, further comprising storing the determined distance in a memory.

10. The method of claim 8 wherein the plurality of distance estimates is received from a plurality of mobile devices.

11. A mobile device adapted to providing an estimated distance between a first wireless access point and a second wireless access point, the mobile device comprising:
a wireless communications interface;
a processing unit communicatively coupled with the wireless communications interface; and
a memory coupled to the processing unit, wherein the memory stores executable instructions for causing the processing unit to:
obtain a plurality of data sets, wherein each data set of the plurality of data sets includes data regarding:
a first Round-Trip Time (RTT) value relating to a distance between the mobile device and the first wireless access point; and
a second RTT value relating to a distance between the mobile device and the second wireless access point;
determine the estimated distance by:
determining a first data set having a lowest first RTT value of any data set of the plurality of data sets;
determining the second RTT value in the first data set; and
estimating the distance between the first wireless access point and the second wireless access point by subtracting a processing delay from the second RTT value in the first data set; and
send, via the wireless communications interface, the estimated distance between the first wireless access point and the second wireless access point.

12. The mobile device of claim 11, wherein the memory further stores instructions for causing the processing unit to determine, for each data set of the plurality of data sets, that a Received Signal Strength Indication (RSSI) value related to either or both of the first RTT value or the second RTT value exceeds a threshold value.

13. The mobile device of claim 11, wherein the memory further stores instructions for causing the processing unit to determine, for each data set of the plurality of data sets, that the first RTT value is below a threshold value.

14. The mobile device of claim 11, wherein the memory further stores instructions for causing the processing unit to:
determine a second data set having a lowest second RTT value of any data set of the plurality of data sets; and
determine the processing delay based on the second RTT value of the second data set.

15. A mobile device adapted to providing an estimated distance between a first wireless access point and a second wireless access point, the mobile device comprising:
a wireless communications interface;
a processing unit communicatively coupled with the wireless communications interface; and
a memory coupled to the processing unit, wherein the memory stores executable instructions for causing the processing unit to:
obtain a plurality of data sets, wherein each data set of the plurality of data sets includes data regarding:
a first Round-Trip Time (RTT) value relating to a distance between the mobile device and the first wireless access point; and
a second RTT value relating to a distance between the mobile device and the second wireless access point;
determine the estimated distance by:
determining a first data set having a highest first RTT value of any data set of the plurality of data sets;
determining the second RTT value in the first data set; and estimating the distance between the first wireless access point and the second wireless access point by subtracting, from the second RTT value in the first data set:
the first RTT value in the first data set, and
a processing delay; and
send, via the wireless communications interface, the estimated distance between the first wireless access point and the second wireless access point.

16. The mobile device of claim 15, wherein the memory further stores instructions for causing the processing unit to sending a confidence value associated with the estimated distance.

17. A server for crowdsourcing a determined distance between a first wireless access point and a second wireless access point of an indoor positioning system, the server comprising:
a wireless communications interface;
a processing unit communicatively coupled with the wireless communications interface; and
a memory coupled to the processing unit, wherein the memory stores executable instructions for causing the processing unit to:
receive distance estimation data comprising:
at least one distance estimate of a distance between the first wireless access point and the second wireless access point, and
at least one confidence value corresponding to the at least one distance estimate;
determine the distance between the first wireless access point and the second wireless access point, based on the at least one distance estimate and the at least one confidence value; and
send the determined distance via the wireless communications interface;
wherein:
the instructions for causing the processing unit to receive the distance estimation data include instructions for receiving a plurality of distance estimates; and
the memory further stores instructions for:
receiving a confidence value for each distance estimate of the plurality of distance estimates; and
causing the processing unit to determine the distance by determining, based on the confidence value of each distance estimate of the plurality of distance estimates, a weighted average of the plurality of distance estimates.

18. The server of claim 17, further comprising instructions for causing the processing unit to store the determined distance in the memory.

19. A non-transitory computer-readable storage medium having instructions stored thereon for causing a processing unit to:
obtain a plurality of data sets, wherein each data set of the plurality of data sets includes data regarding:
a first Round-Trip Time (RTT) value relating to a distance between a mobile device and a first wireless access point; and
a second RTT value relating to a distance between the mobile device and a second wireless access point;
determine the estimated distance by:
determining a first data set having a lowest first RTT value of any data set of the plurality of data sets;
determining the second RTT value in the first data set; and
estimating the distance between the first wireless access point and the second wireless access point by subtracting, from the second RTT value in the first data set;
and
send an estimated distance between the first wireless access point and the second wireless access point.

20. The computer-readable storage medium of claim 19, further including instructions for causing the processing unit to determine, for each data set of the plurality of data sets, that a Received Signal Strength Indication (RSSI) value related to either or both of the first RTT value or the second RTT value exceeds a threshold value.

21. The computer-readable storage medium of claim 19, further including instructions for causing the processing unit to determine, for each data set of the plurality of data sets, that the first RTT value is below a threshold value.

22. The computer-readable storage medium of claim 19, further including instructions for causing the processing unit to:
determine a second data set having a lowest second RTT value of any data set of the plurality of data sets; and
determine the processing delay based on the second RTT value of the second data set.

23. A non-transitory computer-readable storage medium having instructions stored thereon for causing a processing unit to:
obtain a plurality of data sets, wherein each data set of the plurality of data sets includes data regarding:
a first Round-Trip Time (RTT) value relating to a distance between a mobile device and a first wireless access point; and
a second RTT value relating to a distance between the mobile device and a second wireless access point;
determine the estimated distance by:
determining a first data set having a highest first RTT value of any data set of the plurality of data sets;
determining the second RTT value in the first data set; and
estimating the distance between the first wireless access point and the second wireless access point by subtracting, from the second RTT value in the first data set:
the first RTT value in the first data set, and
a processing delay; and
send an estimated distance between the first wireless access point and the second wireless access point.

24. The computer-readable storage medium of claim 23, further including instructions for causing the processing unit to sending a confidence value associated with the estimated distance.

25. A non-transitory computer-readable storage medium having instructions stored thereon for causing a processing unit to:
receive distance estimation data comprising:
at least one distance estimate of a distance between first wireless access point and a second wireless access point, and
at least one confidence value corresponding to the at least one distance estimate;
determine the distance between the first wireless access point and the second wireless access point, based on the at least one distance estimate and the at least one confidence value; and
send the determined distance via a wireless communications interface;
wherein:
the instructions for causing the processing unit to receive the distance estimation data include instructions for receiving a plurality of distance estimates;

each distance estimate of the plurality of distance estimates has a confidence value; and the instructions for determining the distance comprise instructions for determining, based on the confidence value of each distance estimate of the plurality of distance estimates, a weighted average of the plurality of distance estimates.

26. The computer-readable storage medium of claim 25 further comprising instructions for causing the processing unit to store the determined distance in a memory.

27. A mobile device for crowdsourcing a determined distance between a first wireless access point and a second wireless access point of an indoor positioning system, the mobile device comprising:

means for obtaining a plurality of data sets, wherein each data set of the plurality of data sets includes data regarding:
   a first Round-Trip Time (RTT) value relating to a distance between the mobile device and the first wireless access point; and
   a second RTT value relating to a distance between the mobile device and the second wireless access point;

means for determining the estimated distance by:
   determining a first data set having a lowest first RTT value of any data set of the plurality of data sets;
   determining the second RTT value in the first data set; and
   estimating the distance between the first wireless access point and the second wireless access point by subtracting a processing delay from the second RTT value in the first data set; and means for sending an estimated distance between the first wireless access point and the second wireless access point.

28. The mobile device of claim 27, further comprising means for determining, for each data set of the plurality of data sets, that a Received Signal Strength Indication (RSSI) value related to either or both of the first RTT value or the second RTT value exceeds a threshold value.

29. The mobile device of claim 27, further comprising means for determining, for each data set of the plurality of data sets, that the first RTT value is below a threshold value.

30. The mobile device of claim 27, further comprising:
   means for determining a second data set having a lowest second RTT value of any data set of the plurality of data sets; and
   means for determining the processing delay based on the second RTT value of the second data set.

31. A mobile device for crowdsourcing a determined distance between a first wireless access point and a second wireless access point of an indoor positioning system, the mobile device comprising:

means for obtaining a plurality of data sets, wherein each data set of the plurality of data sets includes data regarding:
   a first Round-Trip Time (RTT) value relating to a distance between the mobile device and the first wireless access point; and
   a second RTT value relating to a distance between the mobile device and the second wireless access point;

means for determining the estimated distance by:
   determining a first data set having a highest first RTT value of any data set of the plurality of data sets;
   determining the second RTT value in the first data set; and
   estimating the distance between the first wireless access point and the second wireless access point by subtracting, from the second RTT value in the first data set:
      the first RTT value in the first data set, and
      a processing delay; and means for sending an estimated distance between the first wireless access point and the second wireless access point.

32. The mobile device of claim 31, further comprising means for sending a confidence value associated with the estimated distance.

33. A system comprising:
means for receiving distance estimation data comprising:
   at least one distance estimate of a distance between a first wireless access point and a second wireless access point, and
   at least one confidence value corresponding to the at least one distance estimate;
means for determining the distance between the first wireless access point to and the second wireless access point, based on the at least one distance estimate and the at least one confidence value; and
means for sending the determined distance via a wireless communications interface;
wherein:
   the means for receiving distance estimation data include means for receiving a plurality of distance estimates;
   the system includes means for receiving a confidence value for each distance estimate of the plurality of distance estimates; and
   the means for causing determining the distance include means for determining, based on the confidence value of each distance estimate of the plurality of distance estimates, a weighted average of the plurality of distance estimates.

34. The system of claim 33, further comprising means for storing the determined distance.

* * * * *